United States Patent [19]

Campbell

[11] Patent Number: 4,922,771
[45] Date of Patent: May 8, 1990

[54] BRAKE ADJUSTING TOOL

[76] Inventor: Delmer E. Campbell, 1903 South Ave., Springfield, Mo. 65807

[21] Appl. No.: 392,885

[22] Filed: Aug. 14, 1989

[51] Int. Cl.[5] .............................................. B25B 13/48
[52] U.S. Cl. ..................................... 81/484; 81/176.1; 81/488
[58] Field of Search ...................... 81/488, 176.1, 484; 29/270, 278, 267; 7/100

[56] References Cited

U.S. PATENT DOCUMENTS

| | | | |
|---|---|---|---|
| 3,858,463 | 1/1975 | Klavonich | 81/484 |
| 4,190,931 | 3/1980 | Bianco | 81/484 |
| 4,321,844 | 3/1982 | Krill . | |
| 4,479,273 | 10/1984 | Raden et al. . | |
| 4,713,991 | 12/1987 | Gaug . | |

Primary Examiner—Roscoe V. Parker
Attorney, Agent, or Firm—D. A. N. Chase; Joan Optican Herman

[57] ABSTRACT

A new method and an apparatus for manually rotating the adjusting screw mechanism or star wheel of a vehicle wheel brake is adapted to displace the pawl of the brake adjusting mechanism and disengage it from the star wheel, thereby allowing rotation of the star wheel while the pawl remains disengaged through the use of a single tool, leaving both hands of the mechanic free to manipulate the brake tool.

4 Claims, 1 Drawing Sheet

BRAKE ADJUSTING TOOL

BACKGROUND OF THE INVENTION

This invention relate to a hand tool and more particularly to a tool and a method for manually adjusting brake shoes by rotating the adjusting wheel (or star wheel) of a vehicle brake.

Vehicles utilizing drum/shoe-type self-adjusting brakes operate such that as the brake shoes wear, an adjusting mechanism operates to reduce the clearance between the partially worn brake shoe and the interior surface of the brake drum. A common method of achieving self-adjustment in brake shoes is to utilize an adjustment screw means, such as a star wheel, that is held in a fixed position by an adjusting lever (or pawl) which is spring biased against the adjusting screw or engageable peripheral projections of a star wheel.

To accomplish proper adjustment of the brake shoes the mechanic must initially insert a first tool into the brake mechanism which deflects the spring-biased pawl from engagement with the adjusting screw, and then insert a second tool which allows the mechanic to rotate the adjusting screw or the star wheel to accomplish the necessary brake adjustment. Upon making an adjustment, the tools must then be removed from the brake so that the brake drum may be rotated and the degree of clearance assessed by the mechanic. The repeated insertion and removal of tools as well as the limited space for accomplishing the adjustment maneuvers can create a tedious operation.

SUMMARY OF THE INVENTION

The present invention provides a method and an apparatus for the adjustment of the brake shoe of a drum/shoe-type brake system. This invention allows the operator to use a single tool to both deflect the pawl of the automatic adjustment mechanism to disengage if from the star wheel and rotate the adjusting screw of the brake mechanism through access slots in the rear of the drum brake while the pawl remains disengaged, without removal of the brake drum from the vehicle.

It is therefore an important object of the present invention to provide a method and a tool for the adjustment of the brake shoe of a drum/shoe-type brake system whereby an operator can simultaneously disengage the pawl from the star wheel and rotate the star wheel while the pawl remains disengaged.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
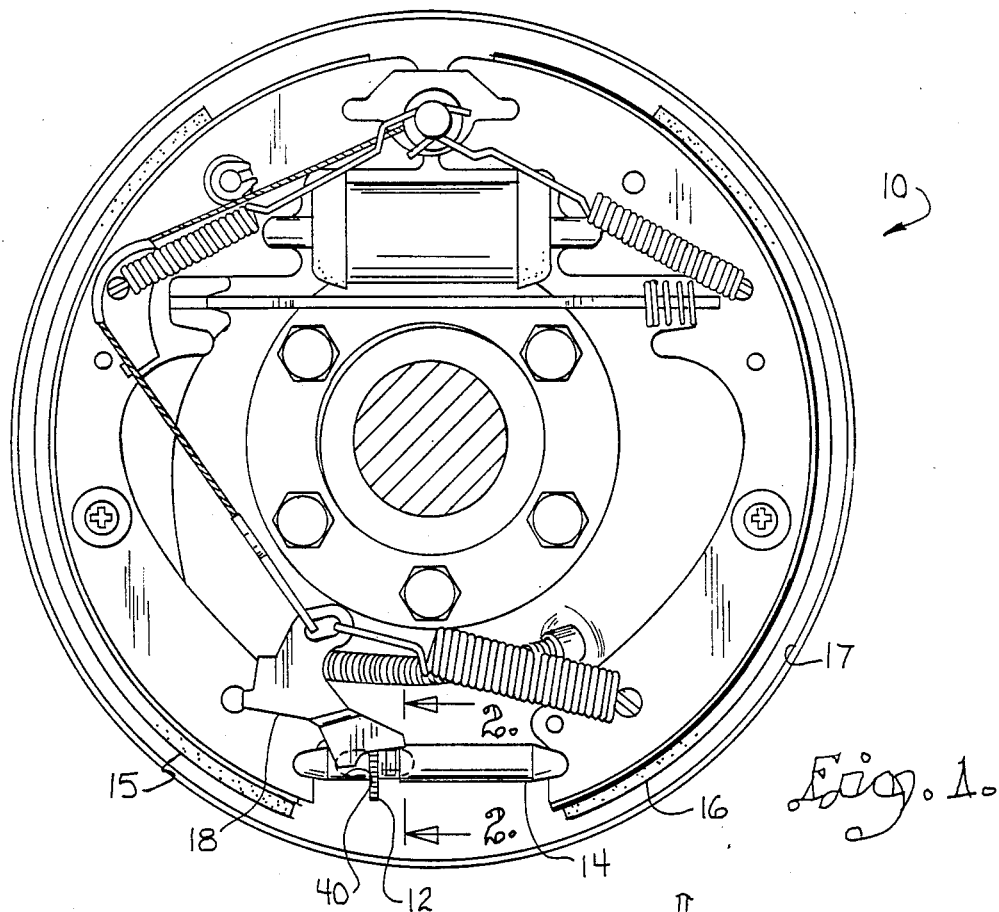
FIG. 1 is a perspective view of a conventional drum/shoe-type self-adjusting brake system.

Referring now to FIG. 1, a drum/shoe-type self-adjusting brake system, generally referred to as 10, is depicted. In this conventional brake system, the adjusting screw mechanism, or star wheel 12, is attached to a brake-adjusting spindle 14. As the star wheel 12 is rotated, the brake shoes 15 and 16 attached to the brake-adjusting spindle 14 may be directed to obtain greater or lesser clearance between the brake drum 17 friction surface and the brake shoes 15 and 16. During normal operation, the star wheel 12 is fixed in place by an adjusting lever or pawl 18 which is spring biased against the teeth of the star wheel 12. When it is desired to vary the clearance between the brake shoes 15 and 16 and the brake drum 17, rotation of the brake-adjusting spindle 14 by means of the star wheel 12 is required. To accomplish adjustment of the spindle 14, the pawl or adjusting lever 18 must be disengaged from the star wheel 12 and the star wheel 12 must then be rotated either clockwise or counter-clockwise to effect the desired change in clearance between the brake drum 17 and the brake shoes 15 and 16. Persons skilled in the art will readily understand the function and details of the foregoing conventional arrangement of the drum/shoe-type self-adjusting brake system.

The brake adjusting tool of the preferred embodiment, generally referred to as 20, comprises an elongated body 22 having a plurality of bends intermediate ends 24 and 26 respectively. End 24 has a plurality of voids 28 on at least one side of the tool 20 which are aligned in series to permit engagement of the voids 28 with the teeth of the star wheel 12. The voids 28 of end 24 are more clearly seen in FIG. 5.

Figures 2, 3, 4, 5:
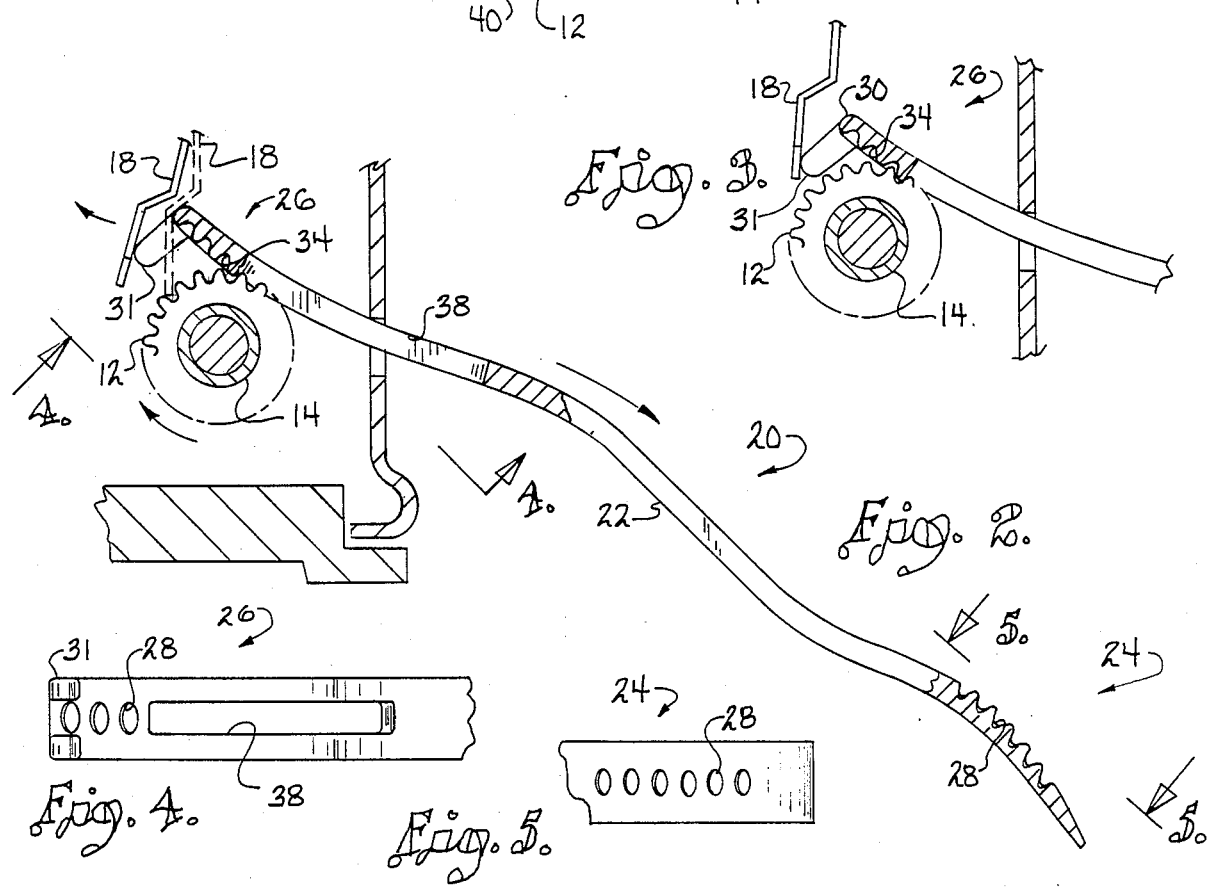
FIG. 2 is a side view taken along line 2—2 of FIG. 1, showing the brake system as in FIG. 1, with the tool of the present invention operably positioned thereon, wherein the pawl is disengaged from the adjusting star wheel mechanism by the tool, the broken lines showing the pawl engaged with the star wheel.
FIG. 3 is a fragmentary side view as in FIG. 2 showing the tool of the present invention, and depicting clockwise movement of the star wheel from its position in FIG. 2.
FIG. 4 is a fragmentary bottom plan view of one end of the tool of the present invention.
FIG. 5 is a fragmentary top view of another end of the tool of the present invention.

End 26 of the tool 20 contains a relatively sharp bend 30 in a single direction, defining a terminal portion 31 which is relatively U-shaped as can be appreciated from the cross-sectional portion of FIGS. 2 and 3, as well as from FIG. 4. End 26 is provided with an elongated opening 38 parallel to the length of the elongated body 22 of the tool 20 and can be easily seen in FIG. 4. The opening 38 is adapted to fit around the star wheel 12 without engaging either side thereof, and will thus not interfere with the movement of the star wheel 12 when portion 31 is operatively engaging the pawl 18. End 26 further contains a series of axially-aligned voids 34 similar to the voids 28 of end 24, and are clearly depicted in FIG. 4. Voids 34 are adapted to engage the teeth of the star wheel 12 after the pawl 18 has been disengaged, thereby permitting the star wheel 12 to be rotated as desired by the operator of the tool 20 in either a clockwise or counter-clockwise direction while the pawl 18 remains disengaged.

In an alternative embodiment, the voids 28 and 34 of the tool 20 are accompanied by a series of laterally spaced grooves, which are transverse to the elongated body 22 of the tool 20, and are adapted to engage the teeth of the star wheel 12. In yet another alternative embodiment of the same invention, the grooves are not accompanied by voids and work by themselves to engage the star wheel 12 as described above.

The method of operation of the invention to accomplish adjustment of the brake shoes 15 and 16 may be best observed in FIGS. 1, 2 and 3. FIG. 1 illustrates the brake housing having a generally elongated slot 40, through which the tool 20 may be operatively positioned. The tool 20 is inserted so that the voids 34 of the tool 20 engage the teeth of the star wheel 12, and the terminal portion 31 of end 26 concurrently displaces the adjusting lever or pawl 18 and prevents it from engaging the teeth of the star wheel 12 and inhibiting movement thereof. The tool 20 may then be operated so as to rotate the star wheel 12 in a clockwise or counter-clockwise direction as desired and thus accomplish the proper displacement of the brake shoes 15 and 16 within the brake drum 17 housing. Opening 38 prevents the tool 20 from interfering with the movement of the star wheel 12 as opening 38 fits around the star wheel 12 without any engagement therewith. In FIG. 2, the pawl 18 is displaced by the tool 20 andn thereby disengaged from the star wheel 12 as shown in solid lines. The pawl 18 is engaged with the star wheel 12 as shown by the broken lines. In FIG. 3, the pawl 18 is only partially displaced as the tool 20 moves the star wheel 12 in a clockwise direction relative to its position in FIG. 2.

The present invention can also be operated in another manner using end 24. As can be seen in FIG. 5, end 24 of the tool 20 contains no sharp bends in the tool head but does contain voids 28 and/or grooves for engagement of the star wheel 12 teeth, and the terminal portion 25 of end 24 tapers to a relatively narrow, flat surface. Terminal portion 25 may be inserted through the access hole 40 in the brake backing plate. By application of forward pressure with relationship to the body of the tool 20, rapid adjustment of the star wheel 12 may be accomplished only in a counter-clockwise direction as the pawl 18 is temporarily displaced, without the pawl 18 remaining disengaged. In this manner, the brakes can be tightened, although they cannot be loosened.

It is to be understood that while certain forms of this invention have been illustrated and described, it is not limited thereto, except in so far as such limitations are included in the following claims.

Having thus described the invention, what is claimed as new and desired to be secured by Letters Patent is:

1. A hand tool for adjusting the star wheel of a brake adjusting spindle of an adjustable drum/shoe-type brake system, comprising:
    an elongated body having a first end and a second end, and further having a plurality of bends intermediate said first and second ends;
    said first end having a plurality of axially-aligned voids adapted to engage the teeth of the star wheel;
    said second end having a terminal portion defined by a relatively sharp bend is said body, said terminal portion adapted to displace the adjusting lever or pawl of the brake system, and thereby disengage the pawl from the star wheel;
    said second end further comprising a series of axially-aligned voids adjacent said bend intermediate said bend and said first end, said voids adapted to engage the teeth of the star wheel, and an elongated opening adjacent said voids, wherein said opening is parallel to the axis of said elongated body thereby permitting rotation of the star wheel by said tool in either a clockwise or counter-clockwise direction while the pawl remains disengaged.

2. The tool as set forth in claim 1, wherein said first end and said second end further comprise a series of transverse grooves adapted to engage the teeth of the star wheel.

3. A hand tool for adjusting the star wheel of a brake adjusting spingle of an adjustable drum/shoe-type brake system, comprising:
    an elongated body having a first end and a second end, and further having a plurality of bends intermediate said first and second ends;
    said first end having a plurality of axially-aligned transverse grooves adapted to engage the teeth of the star wheel;
    said second end having a terminal portion defined by a relatively sharp bend is said body, said terminal portion adapted to displace the adjusting lever or pawl of the brake system, and thereby disengage the pawl from the star wheel;
    said second end further comprising a series of axially-aligned transverse grooves adjacent said bend intermediate said bend and said first end, said grooves adapted to engage the teeth of the star wheel, and an elongated opening adjacent said voids, wherein said opening is parallel to the axis of said elongated body thereby permitting rotation of the star wheel by said tool in either a clockwise or counter-clockwise direction while the pawl remains disengaged from the star wheel.

4. A method for adjusting the star wheel of a brake adjusting spindle of an adjustable drum/shoe-type brake system comprising the steps of:
    inserting a brake adjusting tool through an opening in the brake housing;
    deflecting a spring-biased pawl from engagement with the star wheel using one portion of said brake adjusting tool;
    retaining the pawl in a disengaged manner from the star wheel using the brake adjusting tool in order to prevent the pawl from inhibiting movement of the star wheel;
    rotating the star wheel by engaging the teeth of the star wheel using another portion of said brake adjusting tool, moving said brake adjusting tool to accomplish clockwise or counter-clockwise rotation of the star wheel in order to effectuate the desired adjustment of the brake spindle; and
    removing said brake adjusting tool from the brake system to allow the pawl to engage the teeth of the star wheel.

* * * * *